United States Patent [19]
Filderman

[11] 4,064,975
[45] * Dec. 27, 1977

[54] LAMINATED NOISE-PREVENTING SUPPORT FOR THE FRICTION LINING OF A BRAKE SHOE

[75] Inventor: René Gabriel Filderman, Asnieres, France

[73] Assignee: Societe Anonyme Francaise du Ferodo, Paris, France

[*] Notice: The portion of the term of this patent subsequent to Jan. 29, 1993, has been disclaimed.

[21] Appl. No.: 711,352

[22] Filed: Aug. 3, 1976

[30] Foreign Application Priority Data

Sept. 12, 1975 France .................................. 75.27991

[51] Int. Cl.² ............................................. F16D 65/04
[52] U.S. Cl. .................................. 188/73.5; 188/73.1; 188/250 B
[58] Field of Search ................. 188/73.5, 73.1, 205 A, 188/250 G, 250 B, 250 E, 250 F, 73.3, 73.2, 71.1, 234, 74, 78, 250 R; 192/107 R, 30 V, 109 F

[56] References Cited
U.S. PATENT DOCUMENTS

| 1,781,691 | 11/1930 | Kohr ................... 188/250 F |
| 3,966,026 | 6/1976 | Filderman ............ 188/73.5 |

FOREIGN PATENT DOCUMENTS

| 1,541,124 | 8/1968 | France .................... 188/250 B |
| 2,514,277 | 10/1975 | Germany ................ 188/73.1 |
| 1,525,377 | 10/1969 | Germany ................ 188/73.5 |

Primary Examiner—George E. A. Halvosa
Assistant Examiner—Douglas C. Butler
Attorney, Agent, or Firm—Young & Thompson

[57] ABSTRACT

A friction lining of a braking member in which the lining is fixed to a noise-prevention support and is adapted to be applied against a friction track by the effect of force which is applied to the support over a contact area by a force applying member, this support comprising a laminated structure formed by a stack of a number of wholly metallic sheets contiguous with each other over their entire surface and assembled to each other by localized assembly structure such as welding, crimping or riveting. Braking noise due to the tendency of the sheets to separate from each other at the moment of application of the braking force is prevented by forming at least a part of the localized assembly structure over the actual contact area by which the force-applying member acts on the support which thus has an excellent noise-suppression performance due to its laminated structure while at the same time its thickness does not practically vary at all, whether the brake is in the applied or released condition since the assembly structure is located at the point of application of the braking force.

10 Claims, 6 Drawing Figures

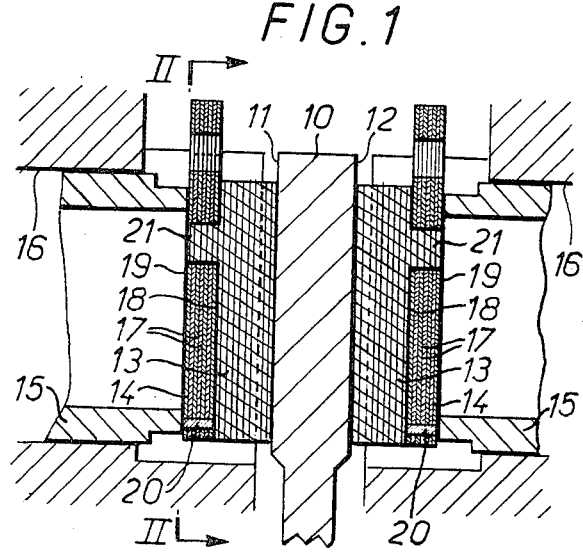
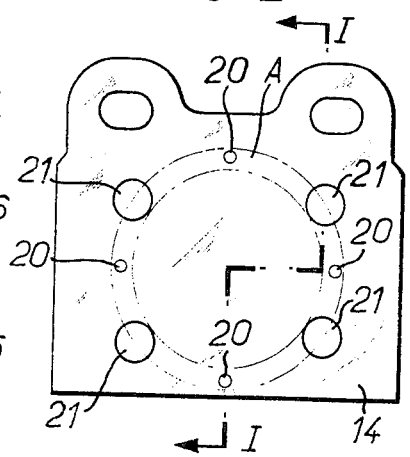
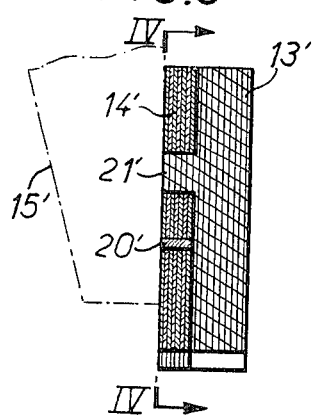
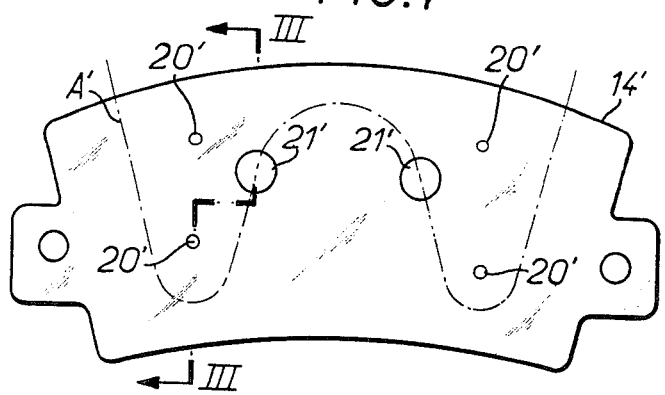
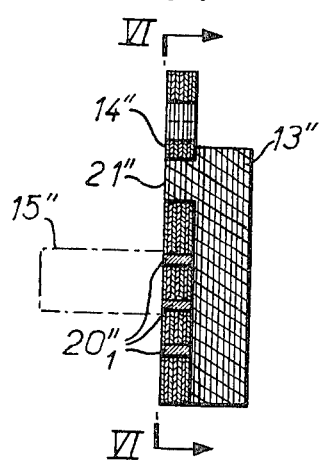
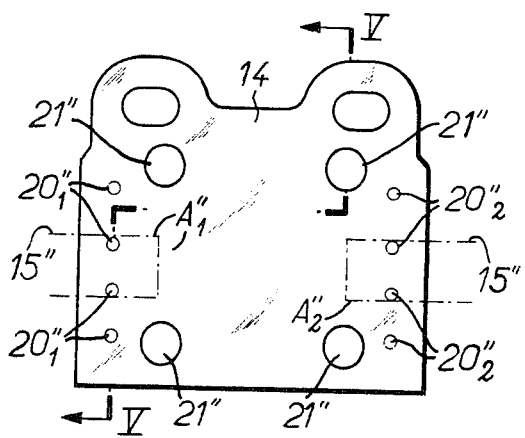

LAMINATED NOISE-PREVENTING SUPPORT FOR THE FRICTION LINING OF A BRAKE SHOE

The present invention relates to a friction lining of a braking member in which the lining is fixed to the support and is intended to be forced against a friction track by the effect of an action (or of a reaction), which is applied on the support over an area of contact by a control (or supporting) means, this support comprising a foliated structure formed by a stack of a number of wholly metallic sheets contiguous with each other over their entire surface and assembled to each other by localized assembly means such as welding, crimping, riveting.

It has been found that such localized assembly means are very favorable and even sometimes necessary for the reduction or elimination of braking noise, to which the foliated structure of the support is directed. In addition, it has become apparent that these localized assembly means should not be too numerous so as to leave between them free zones of sufficient width to result in good efficiency.

On the other hand, this has the disadvantage that in the zones which are left free, the various constituent sheets of the support have a tendency to move away from each other, which, at the moment of application of the braking effort, results in an undesirable increase in the travel of the operating means.

The present invention has for its object improvements in braking members such as jaws and brake-shoes and more particularly a lining support, enabling this disadvantage to be minimized or eliminated.

According to the invention, at least part of the localized assembly means of the support sheets are provided over the contact area by which the operating (or supporting) means acts (or reacts) on the support.

By virtue of this arrangement, the support has excellent noise-suppression performance due to its foliated structure and at the same time its thickness does not practically vary at all, whether the brake is in the applied or released condition, due to the fact that the assembly means are located at the clamping point.

In one form of construction, all the localized assembly means are provided in the contact area, while in an alternative form, additional assembly means are provided outside the said area, especially for the purpose of providing good resistance to bending, for example in the case of ring-brakes.

The localized assembly means which are arranged over the contact area are preferably uniformly distributed in that area.

Forms of construction of the invention are described below by way of example, reference being made to the accompanying drawing, in which:

FIG. 1 is a diagrammatic view in cross-section of a disc-brake, the two shoes of which have supports in accordance with the invention, the left-hand shoe being shown in cross-section taken along the broken line I—I of FIG. 2;

FIG. 2 is a view in elevation of this left-hand shoe, taken in the direction of the arrows II—II of FIG. 1;

FIG. 3 shows an alternative form of shoe in cross-section, taken along the broken line III—III of FIG. 4;

FIG. 4 is a view in elevation of this latter alternative form, taken in the direction of the arrows IV—IV of FIG. 3;

FIG. 5 shows another alternative form of brake-shoe, in cross-section taken along the broken line V—V of FIG. 6;

FIG. 6 is a view in elevation of this other alternative form, taken along the arrows VI—VI of FIG. 5.

Reference will first be made to FIGS. 1 and 2, in which, by way of example, a disk-brake, especially for automobile vehicles, comprises a rotating disc 10 having two opposite friction tracks 11 and 12. Against each track 11 or 12 is intended to be applied the friction lining 13 of a braking member such as a shoe having a support 14 to which the lining 13 is fixed.

This clamping is effected as a result of an action (or a reaction) which is applied against the support 14 over a contact area A, by a control or supporting means. This latter is constituted in this case by a piston 15 slidably engaged in a cylinder 16 and intended to be subjected to a hydraulic pressure.

In the example shown in FIGS. 1 and 2, each piston 15 has a tubular shape and the contact area is annular.

The support 14 comprises a stack of several sheets 17 (five in the example shown) all metallic, uniformly flat and contiguous with each other over their entire surface, the stack of sheets 17 being comprised between an internal metal plate 13 adjacent to the lining 13 and an external metal plate 19, the said sheets 17 and plates 18 and 19 being all assembled to each other by local assembly means 20, such as spot welding, crimping, riveting. The lining 13 is fixed to the support 14 thus constituted by being anchored at 21 in holes provided for that purpose in the support 14.

As can be seen from FIG. 2, the localized assembly means 20 are provided along the annular contact area A by which the piston 15 acts upon the support 14, and are uniformly distributed over the whole area A, in particular with a circular symmetry.

By virtue of the arrangement which has just been described, the support 14 has an excellent anti-noise performance due to its foliated structure 17-18-19 with localized assembly means 20, but at the same time its thickness practically does not vary whether the brake is in the applied or released condition, due to the fact that assembly means 20 for this foliated structure 17-18-19 are arranged over the contact area A, on which the piston 15 acts on the support 14.

Reference will now be made to FIGS. 3 and 4, in which the arrangement is similar to that which has just been described with reference to FIGS. 1 and 2, and in which the parts have been given the same reference numbers followed by an apostrophe; the contact area A', instead of being annular like the area A, has the shape of a W.

The assembly means 20' are provided over the contact area A' and are uniformly distributed thereon, especially along the legs of the W.

There are again seen at 21' the anchorages for the lining 13' in the support 14', and at 15' an operating or support means for the brake which is in this case of the pincer type.

In another alternative form shown in FIGS. 5 and 6, the arrangement is again similar to that which has been described with reference to FIGS. 1 and 2, and the parts have the same reference numbers followed by the index quotation ("). In this case, the brake is of the ring type and the contact area, instead of being annular like the area A, or in the shape of a W like the area A', is composed of two spaced-apart rectangles $A''_1$ and $A''_2$.

The assembly means are arranged in two parallel rows at $20''_1$ and $20''_2$ which pass respectively through the two rectangles $A''_1$ and $A''_2$, with assembly means inside the rectangles and assembly means outside the rectangles; more particularly, in the example of FIG. 6, there are in each row two assembly means in the corresponding rectangle and two on the outside.

With an arrangement of this kind there are obtained results comparable to those which have been previously described, this being due to the assembly means located inside the rectangles $A''_1$ and $A''_2$, but in addition there is obtained a suitable resistance to bending, taking account of the particular conditions of work in the ring brake, this being due to the additional assembly means provided on the outside of the rectangles $A''_1$ and $A''_2$.

There will again be seen at 21" the anchorages of the lining 13" in the support 14", and 15" represents the control or supporting means of the ring brake.

The various arrangements which have been previously described with reference to FIGS. 1 and 2, FIGS. 3 and 4, and FIGS. 5 and 6, are obviously are applicable not only to disc brakes but also to other types of brakes.

What I claim is:

1. A noise-prevention support for a friction lining of a braking member in which the lining is fixed to said support and is adapted to be applied against a friction track by the effect of a force applied to said support over a contact area by force-applying means, said support comprising a stack of a plurality of wholly metallic sheets contiguous to each other over their entire surface and assembled together by localized assembly means, at least part of said assembly means being formed over said contact area by which the force-applying means applies force to said support.

2. A noise-prevention support as claimed in claim 1, in which at least part of said assembly means is arranged on said contact area while another part is located outside said contact area.

3. A noise-prevention support as claimed in claim 2, in which the assembly means located inside said contact area are uniformly distributed over said area.

4. A noise-prevention support as claimed in claim 1, in which said contact area is annular.

5. A noise-prevention support as claimed in claim 4, in which the assembly means are distributed over said annular contact area with a circular symmetry.

6. A noise-prevention support as claimed in claim 1, in which said contact area has the shape of a W.

7. A noise-prevention support as claimed in claim 6, in which said W has legs and said assembly means are distributed along the legs of the W.

8. A noise-prevention support as claimed in claim 1, in which said contact area is constituted by two spaced-apart rectangles.

9. A noise-prevention support as claimed in claim 8, in which said assembly means are disposed in two parallel rows passing respectively through said two rectangles, having assembly means inside said rectangles and assembly means outside said rectangles.

10. A noise-prevention support as claimed in claim 1, in which said support is adapted to receive the lining fixed by anchorage.

* * * * *